CHARACTER TRANSMISSION AND REPRODUCTION SYSTEMS

Filed Oct. 4, 1966 6 Sheets-Sheet 1

Inventors
A. G. COULTER
B. B. ENGLISH
By Cameron, Kerkam & Sutton
Attorneys

CHARACTER TRANSMISSION AND REPRODUCTION SYSTEMS

Filed Oct. 4, 1966 6 Sheets-Sheet 2

Inventors
A.G. COULTER
B.B. ENGLISH
By
Cameron, Kerkam & Sutton
Attorneys

Inventors
A.G. COULTER
B.B. ENGLISH
By Cameron, Kerkam & Sutton
Attorneys

CHARACTER TRANSMISSION AND REPRODUCTION SYSTEMS

Filed Oct. 4, 1966 6 Sheets-Sheet 4

Inventors.
A. G. COULTER
B. B. ENGLISH
By Cameron, Kerkam & Sutton
Attorneys

CHARACTER TRANSMISSION AND REPRODUCTION SYSTEMS

Filed Oct. 4, 1966 6 Sheets-Sheet 5

Inventors
A. G. COULTER
B. B. ENGLISH
By Cameron, Kerkam & Sutton
Attorneys

Dec. 16, 1969 A. G. COULTER ET AL 3,484,550

CHARACTER TRANSMISSION AND REPRODUCTION SYSTEMS

Filed Oct. 4, 1966 6 Sheets-Sheet 6

Inventors
A. G. COULTER
B. B. ENGLISH
By Cameron, Kerkam & Sutton
Attorneys

United States Patent Office 3,484,550
Patented Dec. 16, 1969

3,484,550

CHARACTER TRANSMISSION AND REPRODUCTION SYSTEMS

Albert George Coulter, South Queensferry, West Lothian, and Brian Box English, Edinburgh, Scotland, assignors to Ferranti, Limited, Hollinwood, England, a company of Great Britain and Northern Ireland Filed Oct. 4, 1966, Ser. No. 584,173
Claims priority, application Great Britain, Oct. 9, 1965, 42,927/65
Int. Cl. H04l *15/24, 15/34, 17/16*
U.S. Cl. 178—30 21 Claims

ABSTRACT OF THE DISCLOSURE

A character transmission system including a transmitter wherein each character is set up in dot-matrix form and the signals which represent the dots are transmitted column by column of the matrix, each column in serial form, to a receiver. The received signals are applied in appropriate synchronism to energise a counter and in turn a line of styli representing a column of the matrix and extending across a moving sheet of electro-responsive material for creating the character column by column. Each stylus provides a substantially straight line contact with the electro-responsive material in a direction normal to the feed and is energised continuously throughout a cycle of the counter.

Figure 1:
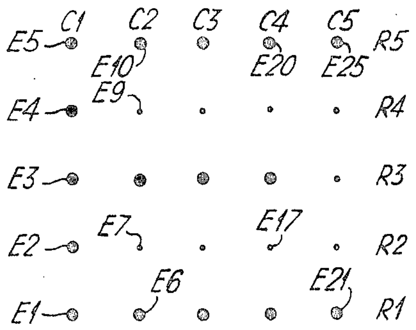

This invention relates to character transmission and reproduction systems.

Known systems of that kind usually require comparatively complicated and costly equipment for both the transmitter and the reproducer. The teleprinter is a particular example of this. Where the system is of the kind in which a single transmitter at a fixed or other base location is required to communicate to a substantial number of reproducers—on mobile stations, for example—it is clearly desirable for the reproduction equipment, at least, to be comparatively simple and inexpensive.

An object of the invention is to provide a new and useful character transmission and reproduction system.

A further object is to provide such a system in which the equipment necessary for each reproducer, at least, is simple and inexpensive.

Two further objects are to provide for a character transmission and reproduction system the apparatus for the transmitter and for the reproducer, respectively.

In accordance with the present invention, a character transmission and reproduction system comprises transmitting apparatus which includes arrangements for automatically encoding each character into the appropriate elements of a matrix of $N_E$ elements arranged in $N_C$ columns and $N_R$ rows, signals-deriving means for deriving from each character so encoded a train of $N_C$ groups each of $N_R$ mark/space electrical signals in series, the groups representing the columns of the matrix in turn and the signals in each group representing the required mark or space condition of the respective elements of the column concerned, and arrangements for transmitting each such train of signals, and reproducing apparatus which includes a drive for feeding responsive material in tape or sheet form past a recording head, an assembly of $N_R$ recording devices disposed in a row at the recording head across the direction of feed of said material, the material being such that a device when energised causes a visible mark to be recorded on the material as an element of said matrix, connections for applying each of said groups of a received train to the recording devices as the material is fed past the recording head, signal distributor for causing each mark signal of a group to be applied to energise the recording device which represents the row position of the element represented by that signal, and synchronising arrangements for maintaining the distributor in synchronism with each received train of signals.

Also in accordance with the invention, there is provided for a transmission and reproduction system transmitting apparatus or reproducing apparatus as set forth in the proceding paragraph.

Broadly, the transmitting apparatus of a system in accordance with the invention operates by analysing or encoding each character into the relevant elements of a rectangular matrix of $N_E$ elements arranged in $N_C$ columns and $N_R$ rows, and transmits to the reproducer a train of signals which represents in serial form the elements necessary to build up an approximate facsimile of the character.

For this purpose the apparatus includes a stage having an array of $N_E$ output conductors, one for each element of the matrix. When a charatcer, has been encoded, each output conductor is conditioned to one or other of two states of energisation in dependence on whether or not the element it represents is required for that character. With the character thus set up on the array, the conductors are scanned one at a time, to sense the state of each and so derive for transmission a train of $N_C$ groups each of $N_R$ mark or space signals in series, the groups representing the columns of the matrix in turn and the signals in each group representing the respective rows and hence the required mark or space condition of the respective elements of the column.

The scanning is effected by means of $N_E$ two-state switching devices, one for each element of the matrix and conveniently arranged in its columns and rows. To each device is connected that one of the output conductors which represents the same character, so that the state of the device is determined by that of the conductor. The actual scanning is carried out by a system of counters which sense the states of the devices, and hence of the conductors, in turn.

Each associated reproducer includes some arrangement for driving responsive material in the form of a metallised tape (or a sheet) continuously or intermittently past a recording head. This may contain an assembly of $N_R$ recording electrodes or styli (representing the respective rows of the matrix) disposed in a straight line across the direction of tape feed in slight contact with the tape. On the same side of the tape is an electrode common to all the styli and engaging the metallised surface. This surface is such as to produce a mark (by burning or by some other chemical reaction) each time a stylus is energised with respect to the common electrode.

Each received signal train is applied to the styli so that each signal of a group energises the stylus which represents the row position of the element represented by that signal. Thus, as the tape is fed past the styli, their assembly represents the columns of the matrix in turn, and during each period whilst the assembly is representing a particular column, the signals of the corresponding group energise in turn the styli required to produce a mark in that column. Some form of synchronising signal is included in each transmitted train so as to ensure that the signals in the group energise the correct styli. By this movement of the tape past a single "column" of styli the effect of a matrix is reproduced. Other kinds of recording paper and electrodes are available.

Figure 2:
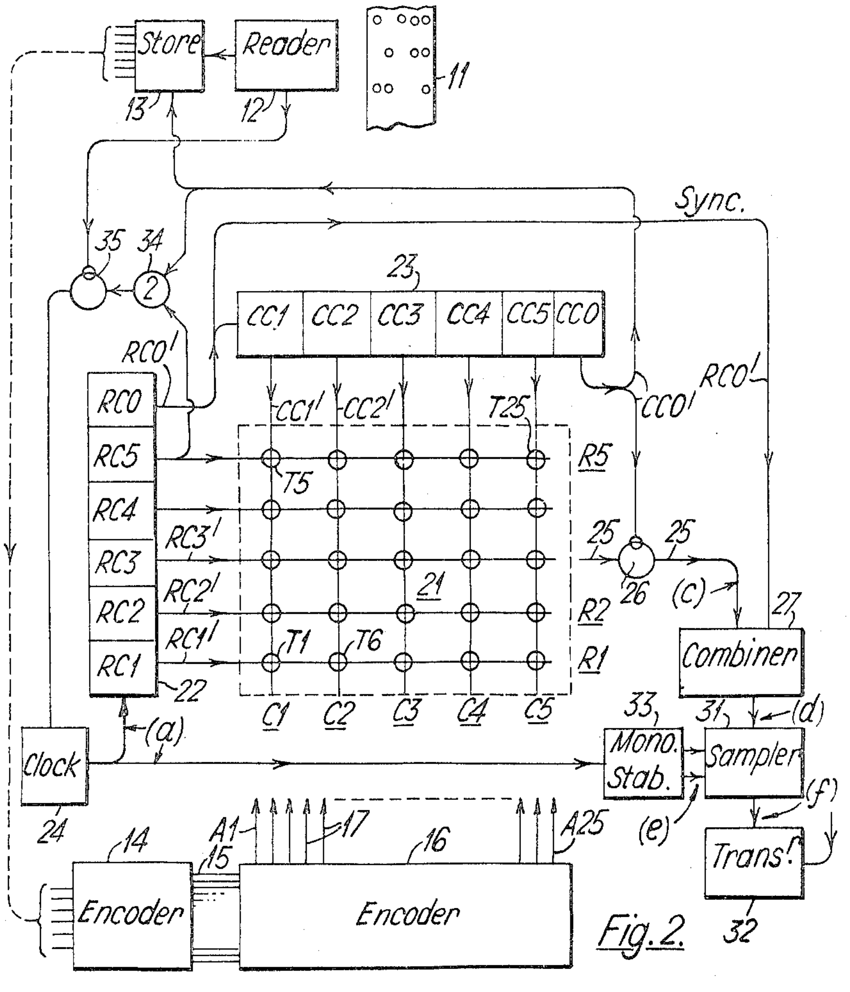
Figure 3:
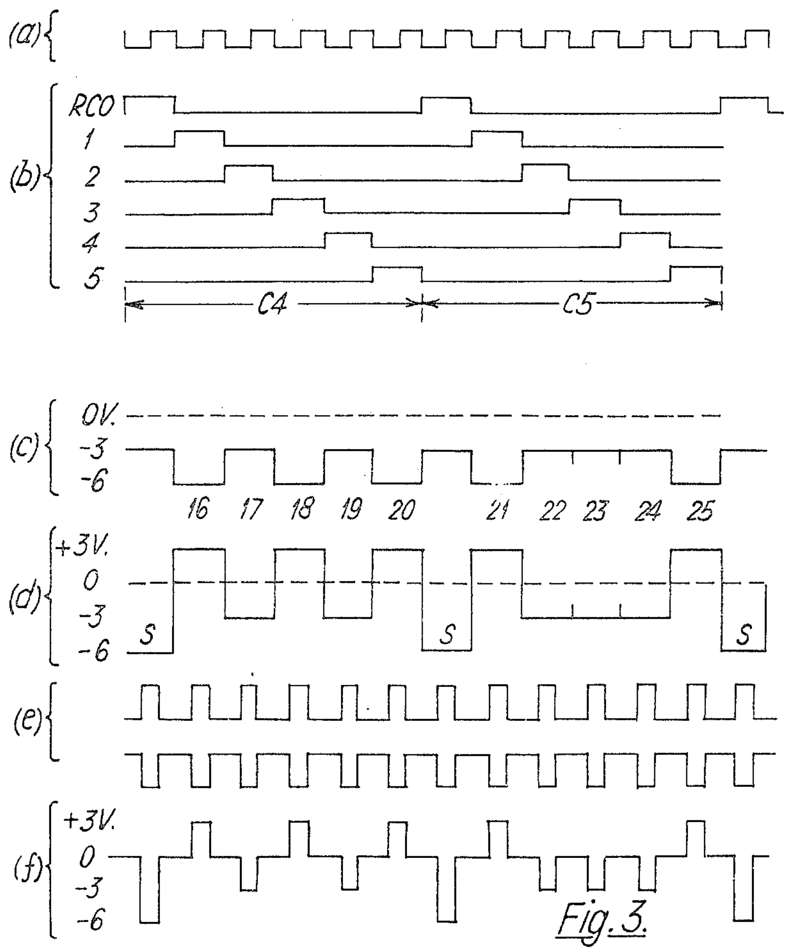
Figure 4:
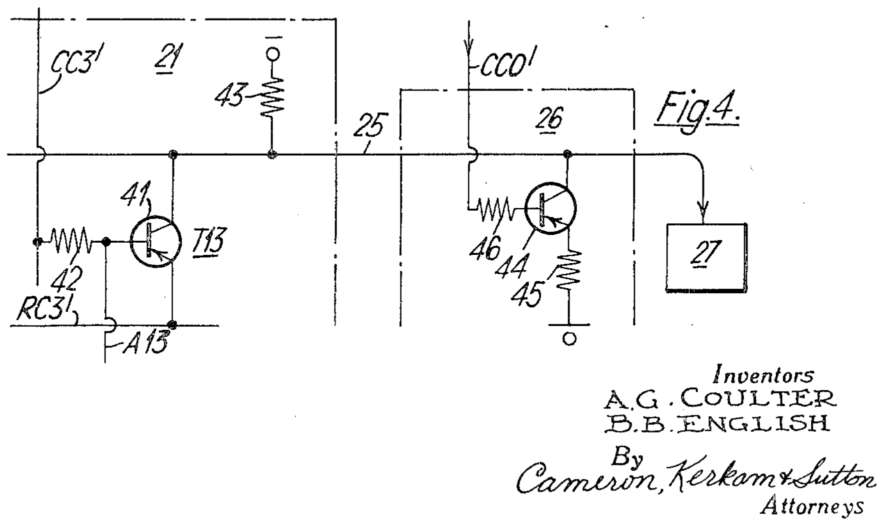
Figures 5, 7, 8, 9:
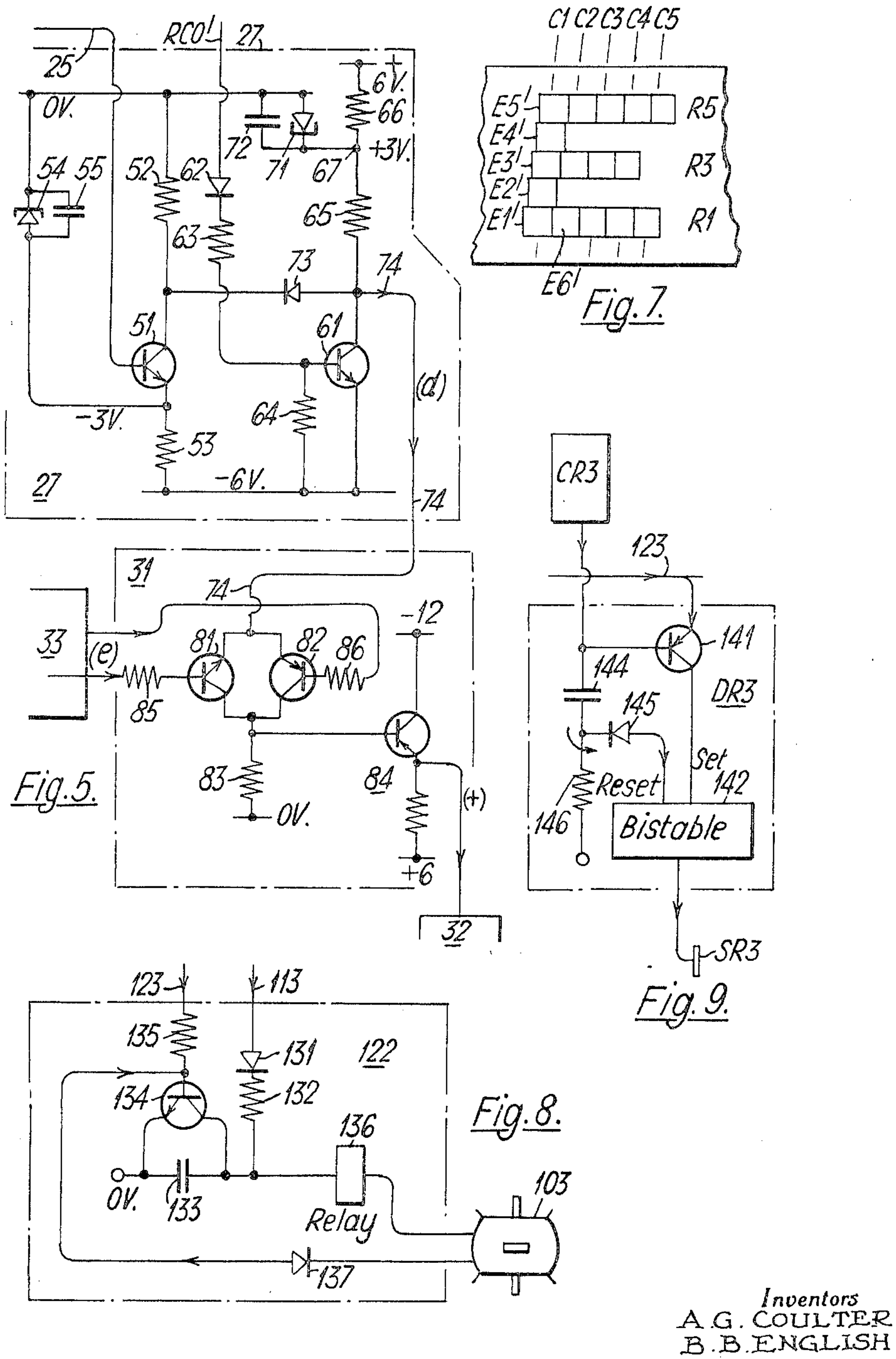
Figure 6:
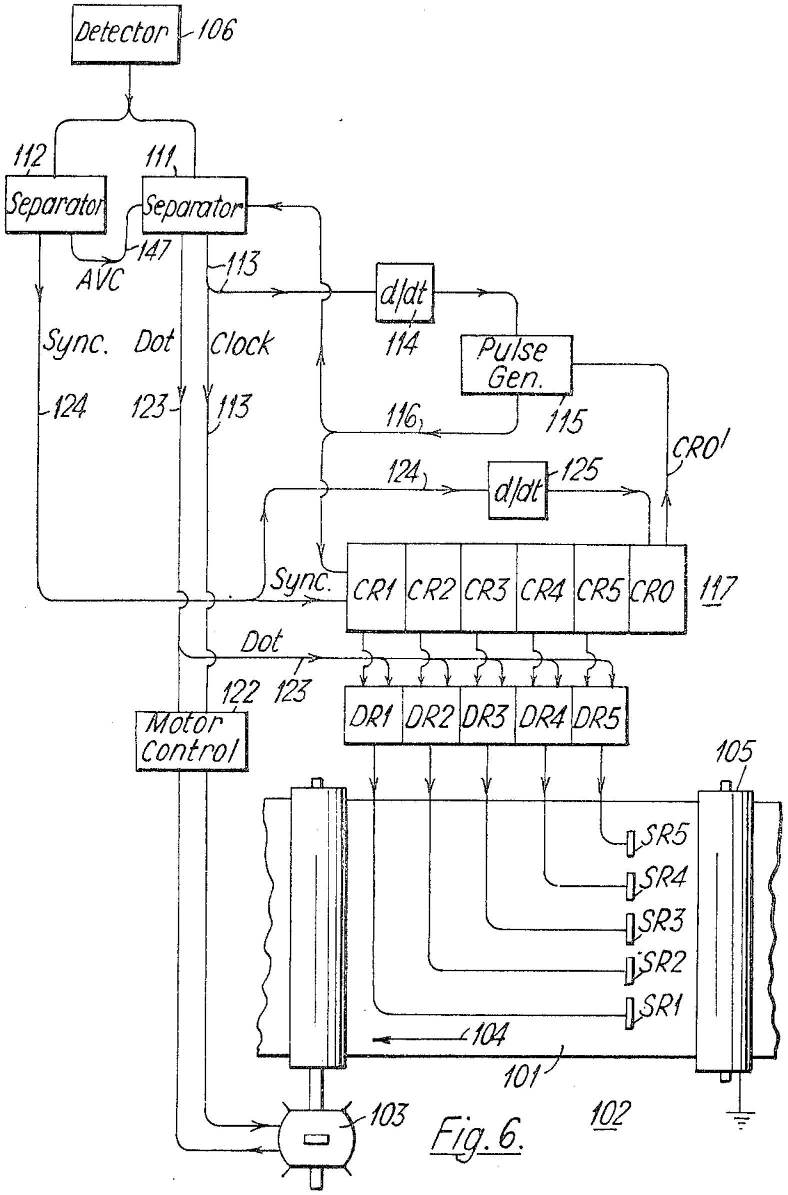
Figure 10A:
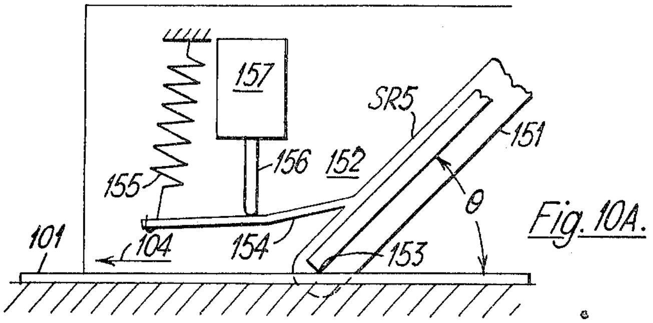
Figure 10B:
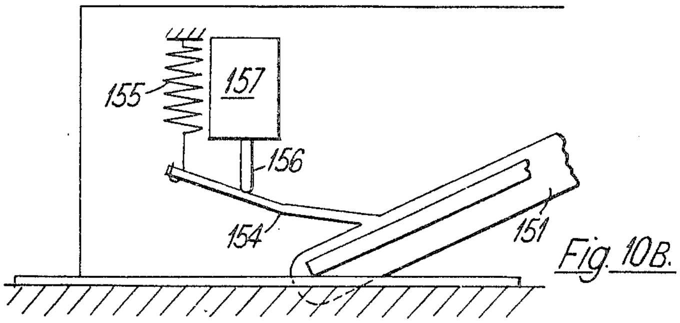
Figure 11:
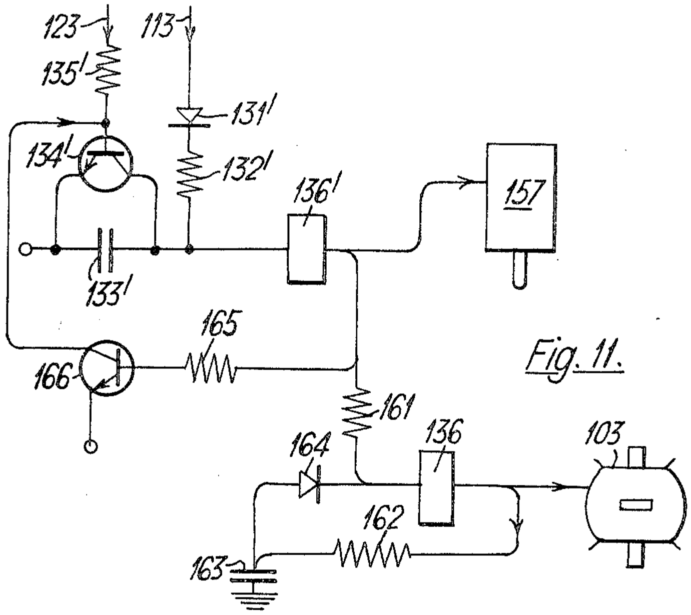
Figure 12:
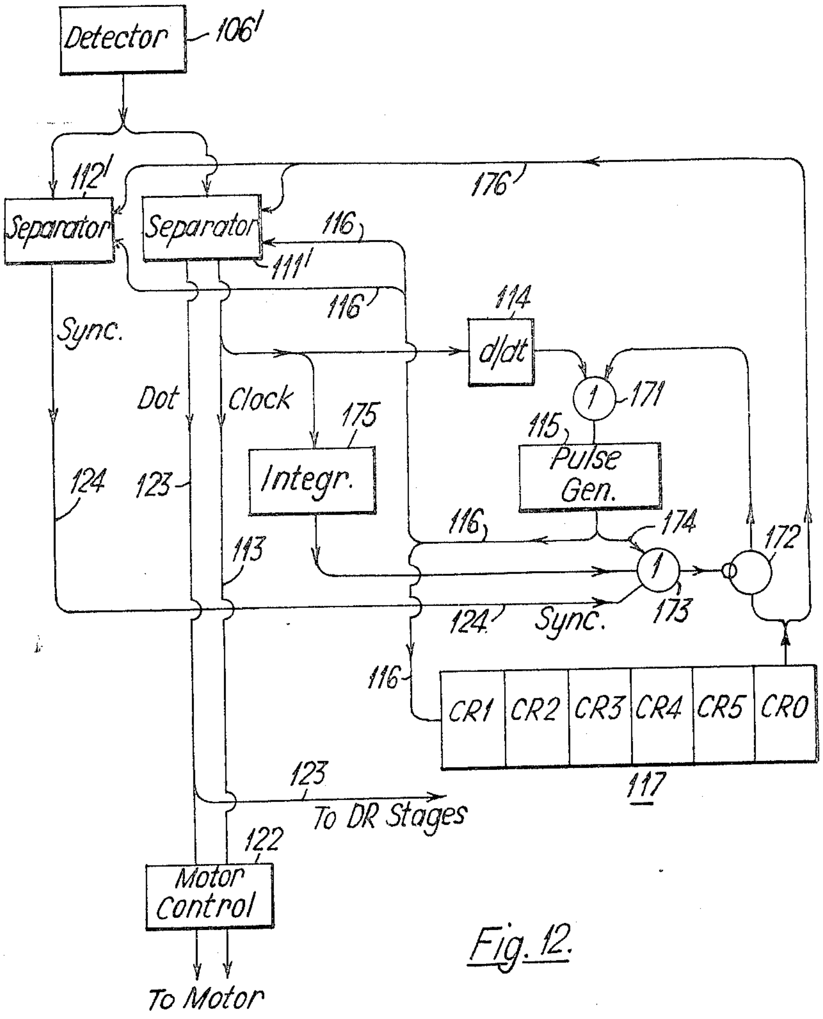

A particular embodiment of the invention will now be described in more detail, by way of example, with reference to the accompanying drawings, in which FIGURE 1 shows a convenient form of matrix, FIGURES 2 and 6 are schematic diagrams of the transmitting and reproducing apparatus respectively, FIGURE 3 is a set of waveforms to illustrate the operation of a part of the apparatus of FIGURE 2, FIGURES 4 and 5 show details of part of the apparatus shown generally in FIGURE 2, FIGURE 7 illustrates the reproducing action of the apparatus of FIGURE 6, FIGURES 8, 9, and 10*a*–10*b* show details of parts of the apparatus shown generally in FIGURE 6, and FIGURES 11 and 12 show alternative arrangements of the circuits of FIGURES 8 and 6 respectively.

In this embodiment it is assumed that the system is required to transmit and reproduce any of 47 characters, including the letters of the alphabet, the arabic numerals, and the usual typographical and algebraic symbols, which are received at the transmitting station in five-bit binary form on punched tape.

As shown in FIG. 1, the matrix consists of 25 elements E1 to E25 arranged in five columns C1 to C5 and five rows R1 to R5. The elements required to reproduce, say, the character E are indicated by large dots and those not required by small dots. In practice, as will be described later, the elements as marked on the tape are square and no mark is produced where an element is represented by a space signal. The matrix does not of course exist as a structure, but is merely the hypothetical framework on which each character is formed.

In the transmitting apparatus—see FIG. 2—the tape 11, punched to represent the characters in accordance with the international telegraph code, is arranged to be driven past and read by a tape reader 12 the output from which is applied to a binary store 13; this includes a five-bit store together with the usual diode logic network and one-bit store for deriving a sixth bit for case-shift purposes, thereby increasing the effective range of the characters stored to the required 47. Signal-encoding stages for automatically encoding each character into the appropriate elements include a diode logic decoding stage 14 designed to read the contents of store 13 to ascertain the character stored and to represent that character by distinctively energizing a particular one of 47 output leads 15 which is allocated to that character.

Leads 15 are connected to an encoding stage 16. This is provided with an array 17 of twenty-five output conductors A1 to A25 which represent the respective elements of the matrix and the stage is designed so that in response to the energisation of any particular one of input leads 15 the character concerned is represented by the distinctive state of energization of those of conductors A1 to A25 which represent the elements required to form that character.

The signal-deriving means include a switching array 21 of twenty-five two-state devices T1 to T25 representing the respective elements of the matrix and for convenience arranged like it in columns C1 to C5 and rows R1 to R5. Each device is connected to that one of conductors A1 to A25 which represents the same element of the matrix. The two states of each device will be referred to as its ON and its OFF state, represented by the potential level of its output, and the arrangement is such that when stage 16 holds a character, as represented by the distinctive energisation of the appropriate ones of conductors A1 to A25, only those devices are conditioned to their OFF state which represent the elements required for that character, the remaining devices, representing unwanted elements, being conditioned to their ON states.

To allow the twenty-five devices T1–T25, and hence the output conductors A1 to A25, to be scanned without needing the same number of counter stages, the signal-deriving means also include two cascaded ring counters 22 and 23 of six stages each and arranged to scan respectively the rows and columns of the array 21. In row counter 22, five of the stages RC1 to RC5 are associated with the respective rows; the output from stage RC1 is connected by a lead $RC1^1$ to all the devices in row R1; that from stage RC2 by a lead $RC2^1$ to all those in row R2; and so on. The sixth stage RC0 is not associated with any particular row. The counter is arranged to be driven by a pulse generator or clock 24 so that the stages are stepped one at a time cyclically and unidirectionally, in the usual counter manner.

Stage RC0 is connected to apply over a lead $RC0^1$ a drive to column-counter 23 which, in response to sequential pulses received over that lead, steps its own stages CC1 to CC5 and CC0 one at a time cyclically. Thus the scanning rate of counter 23 is only one sixth of that of counter 22. Stages CC1 to CC5 are connected by leads $CC1^1$ to $CC5^1$ to all the devices in column C1 to C5 respectively. Stage CC0 is not associated with any particular column.

Array 21 has an output lead 25 common to all twenty-five switching devices. This lead is connected by way of a potential clamping stage or clamp 26 as one of the inputs to a signal combining stage 27, the other input to which is in the form of a synchronising (sync) signal derived over a lead $RC0^1$ from stage RC0 of counter 22. The output from stage 27 is connected by way of a signal sampling gate 31 to arrangements for transmitting the train of signals derived (in the manner to be described) by the scanning of the array 21; these arrangements are depicted as a radio transmitter 32. Gate 31 is of the transmission kind and is controlled by clock 24 by way of a monostable stage 33 the unstable conditions of which have a shorter duration than the clock pulses. The control of clamp 26 is exercised over a lead $CC0^1$ by stage CC0 of counter 23.

To arrest clock 24 at the end of each transmission of a character 1 the outputs from stages CC0 and RC5 are connected as inputs to a two-entry And gate 34 the output from which is applied to the clock to arrest it when both these leads are energised. To release the clock for further actuation, the connection to it from the gate 34 is by way of an Inhibit gate 35 so controlled by the tape reader 12 that the arrival at the reader of a sprocket hole in the tape causes gate 35 to be closed and so free the clock from the signal from gate 34 which stopped it.

To allow store 13 to be cleared after the character in it has been transmitted, a connection is made to it from stage CC0.

In describing the operation it will be assumed to begin with that a character has just been transmitted and in consequence stages RC5 and CC0 are actuated—that is, are in their ON state—holding the clock 24 inoperative and so preventing further stepping of the counters. Further, the activation of stage CC0 has emptied store 13.

On the arrival at tape reader 12 of the next character to be transmitted, represented by the usual coded group of punchings, the reader derives the signals appropriate to storing that character in store 13. In response, stage 14 energises the particular one of its output leads 15 which represents that character, and stage 16 distinctively energises the appropriate ones of conductors A1 to A25 which represents the elements necessary to depict it.

By "distinctively energises" is meant causing each of those conductors to have a like state of energisation which is different from the like state of energisation of each of the other conductors—that is, those representing unwanted elements. These two states are constituted by different potential levels, one of which may be earth potential.

The corresponding ones of switching devices T1 to T25 are thereby conditioned to their OFF states, the remainder being ON. Thus the character has in effect become represented in array 21 by those of the devices that are OFF.

By this time the corresponding sprocket hole in the tape 11 has closed gate 35 and so released the clock. Whilst the character is represented as just described, the clock, acting through the counters 22 and 23, so scans array 21 as to cause a train of signals to be transmitted to represent that character, the action being as follows.

The first pulse from the clock steps counter 22 on to stage RC0, thereby initiating the transmission by supplying over lead RC0[1] a sync signal to the combining stage 27. The pulse also causes counter 23 to be stepped from stage CC0 to stage CC1. With both inputs to gate 35 thus removed, the clock does not become arrested even when the sprocket hole has passed out of registration with the reading head and so reopened gate 35.

Whilst counter 23 remains with stage CC1 activated, thereby selecting column C1 of the matrix, the next five pulses step counter 22 through stages RC1 to RC5 in turn.

With stage RC1 activated by the first of these pulses, the state of device T1 at the junction of column C1 and row R1 is sensed. If it is OFF, the resulting output over common lead 25 for the duration of a clock pulse repetition period has a particular potential level which is different from that it would have if it were ON. These two potential levels will be referred to as the dot and no-dot levels.

The next pulse similarly senses the state of device T2 in the same column but in the next row R2. The next three pulses similarly sense devices T3 to T5. These sequential potential level outputs pass over lead 25 as one of the inputs to stage 27, clamp 26 being inoperative as stage CC0 is as yet unactivated.

The sixth pulse steps counter 22 to stage RC0, thereby stepping counter 23 to stage CC2 and applying another synch pulse to stage 27. The output from this stage thus has a stepped waveform of different potential levels—dot, no-dot, and sync, the last being below the no-dot level.

Monostable stage 33 is triggered by each clock pulse to generate a gating pulse of shorter duration which opens gate 31 to sample waveform 36 in approximately the middle of each step so as to produce a pulsed waveform. These waveforms are described in more detail below with reference to FIG. 3.

The next five pulses step counter 22 similarly from stages RC1 to RC5 again, but this time whilst counter 23 defines column 2 by activating stage CC2. Thus devices T6 to T10 are scanned, with a sync pulse preceding the resulting signals as before.

This scanning sequence is repeated for columns C3 to C5 until device T25 has been sensed.

The next pulse steps counter 22 to stage RC0 thereby stepping counter 23 to stage CC0. This has three results: (a) store 13 is cleared, ready to receive the next character; (b) clamp 26 is actuated to hold the output signal over lead 25 at the no-dot level; and (c) one of the two inputs to gate 34 is energised.

Whilst stage CC0 remains activated, the next five pulses step counter 22 from stage RC1 to RC5. During this phase, clamp 26 maintains the output at the no-dot level. When stage RC5 is reached, the other input to gate 34 is thereby energised, and accordingly a signal is passed through gate 35 to arrest the clock; gate 35 is open, because no sprocket hole is in registration with the reader when a code group of punchings is being read from the store.

The apparatus has thus been restored to the condition first described, and remains so until the movement of the tape brings the next code group to the read position, with another sprocket-hole to release the clock and so initiate another transmission.

Thus in response to a reading of each character, there is transmitted from transmitter 32, usually in the form of a modulation of a radio-frequency carrier, a series train of five signal groups, each of five pulses preceded by a sync pulse to represent the character by the matrix elements required to depict it, and a sixth group of no-dot signals to provide the space between characters. The dot and no-dot signals have been described above as mark or space signals since they are effective to cause a mark or no mark, as the case may be, to appear on the recording tape.

The nature of the signal derived from array 21 and of the modulation to be transmitted may be more clearly understood from consideration of the waveforms of FIG. 3, which show the result of scanning columns C4 and C5 of the array of switching devices whilst the letter E is being transmitted. The various potential levels indicated are not to be regarded as limitative, but are merely those found suitable in a particular embodiment of the invention in which the switching devices take the form of transistors, as will shortly be described below with reference to FIG. 4.

The clock pulse waveform is shown at (*a*).

At (*b*) are shown the resulting outputs from counter 22 starting with that stage RC0 and continuing, in chronological order, with those from stages RC1 and RC5. The scan is shown twice—once for column C4 and once for column C5.

The corresponding outputs over common lead 25 are shown at (*c*), with each step indicated by the number of the device which is sensed to produce it. Sequential output levels are −6 v. or −3 v. depending on whether the device scanned is OFF or ON. As column C4 requires dots for elements E16, 18, and 20—see FIG. 1—but no-dots for elements E17 and 19, the outputs are −6 v. when devices 16, 18, and 20 are sensed, as these devices must be OFF to produce that pattern, but −3 v. when devices T17 and 19 are sensed. The sensing of column C5 produces a similar result, except that this time a no-dot condition is required from the central element—E23—of the column.

The combining stage 27 reverses the direction of these potential steps and inserts the sync steps in the hitherto unoccupied spaces immediately in advance of the sensing of devices T16 and T21—see waveform (*d*), where the sync steps are indicated at S. The potential levels are now +3, −3, and −6 volts for dot, no-dot, and sync.

Monostable stage 33 applies to transmission gate 31 the control signals of waveforms (*e*); both positive-going and negative-going signals are applied so as to sample both the negative and positive portions of waveforms (*d*). Thus the signal passed to modulate the transmitter 32 is as shown at (*f*).

As already mentioned, the switching devices T1 to T25 of array 21 may each take the form of a NPN transistor. FIG. 4 shows a suitable circuit, taking as an example device T13, defined by the intersection of the leads RC3[1] and CC3[1] from stages RC3 and CC3. The device includes a transistor 41 the emitter of which is connected direct to lead RC3[1] and the base to lead CC3[1] by way of a resistor 42 individual to that device. Also connected to the base is the corresponding conductor A13 from stage 16. The collector is connected direct to the common output lead 25, to which a source of negative potential is applied by way of a load resistor 43 common to the whole array. The transistor is switched to its OFF, or non-conducting, state only when conductor A13 is distinctively energised, and the device has been reached in the scan by counters 22 and 23 having been stepped to energise their RC3[1], CC3[1] output leads. If no dot is required, the energisation of lead A13 is such as to cause the transistor to be rendered conductive when reached on the scan.

Clamping stage 26 includes a transistor 44 similar to the transistors of the array. The emitter is connected to a zero-volt source by way of a resistor 45, the collector to lead 25, and the base by way of a resistor 46 to lead CC0[1] from counter 23. When lead CC0[1] becomes energised, the transistor is rendered conductive and so represents the no-dot condition.

Stages 27 and 31 may take the form shown in FIG. 5.

The output signal received from array 21 over lead 25 is applied to the base of a NPN transistor 51, the collector of which is connected to a source of zero volts by way of a lead resistor 52 and the emitter of which is connected to a source of −6 volts by way of a resistor 53. The emitter is held at a constant potential of −3 volts by a Zener diode 54 connected to the 0 volts source and shunted by an electrolytic capacitor 55.

The sync signal received from counter 22 over lead RC0[1] is applied to the base of a second NPN transistor by way of a diode 62 and resistor 63. The base is also connected by way of a resistor 64 to a source of −6 volts, to which the emitter is connected direct. The collector is connected to a source of +6 volts by way of resistors 65 and 66 the common point 67 of which is held at +3 volts by a Zener diode 71 connected to the 0 volts source source and shunted by a capacitor 72.

The link between these two transistor units is a connection made from the collector of transistor 51 to the collector of transistor 61 by way of a diode 73 poled to pass negative-going signals. The output from stage 27 is taken from the collector of transistor 61 and applied to stage 31 over a lead 74.

In operation, if a transistor of array 21 is in its ON state when sensed during a scan, requiring a no-dot signal, the output from that transistor, as received over lead 25, switches transistor 51 on—see waveform (*c*). Transistor 51 applies to output lead 74 the −3 volts of the emitter as stabilised by Zener diode 54—see waveform (*d*). Transistor 61 is off, as there is no sync signal present. When on the other hand the sensed transistor is OFF, requiring a dot signal, lead 25 is −6 volts, thereby switching transistor 51 off; thus the output over lead 74 is the +3 volts of point 67 as stabilised by diode 71. Each sync signal received over lead RC0[1] is positive going; this switches transistor 61 on and so applies to lead 74 the −6 volts of the emitter.

Transmission gating stage 31 includes NPN and PNP transistors 81 and 82, to the common emitters of which lead 74 is connected. The collectors share a common load resistor 83 and are connected to transmitter 32 by way of an emitter-follower stage 84. The counter-phase outputs of output waveforms (*e*) from stage 33 are applied by way of resistors 85 and 86 to the bases of the transistors—the positive-going output to transistor 81 and the negative-going to transistor 82. These transistors act as switches to sample the output signal received from stage 27 over lead 74 to produce the signal of waveform (*f*) as already described.

A suitable arrangement for the associated reproducing apparatus is shown in FIG. 6.

A drive for feeding metallised paper tape 101 past a recording head 102 includes an electric motor 103. At the recording head the metallised side of the paper is lightly engaged by a bank of resilient electrodes or styli SR1 to SR5, one for each row of the matrix. The styli are disposed in a straight line across the direction 104 of the tape feed; each has an elongated or chisel edge to provide a substantially line contact normal to that direction, and the body of the stylus is slanted away from the direction of tape movement to avoid all risk of cutting into the paper. The styli are spaced close together with just sufficient clearances to keep them insulated from one another. In engagement with the same side of the tape is a roller electrode 105 common to them all. By energising a stylus with respect to that electrode, which for convenience is at earth potential, a portion of the metallising is burnt off, leaving a mark.

In the reproducing process, described in detail below, each column-representing group of the received train of signals is applied to the styli in turn as the tape 101 is fed past the recording head; each signal of the group is applied to the particular stylus which represents the same row position as that signal. The arrangements for so applying the groups of the received train are as follows.

Each train of signals from the transmitting apparatus, which may be as described above with reference to FIG. 2, is received by equipment which includes a detector stage 106 which derives the modulation having the general waveform shown in FIG. 3(*f*) and applies it to signal-separator means in the form of first and second signal-separating stages 111 and 112.

Stage 111 is arranged to derive over an output lead 113 a positive pulse for each data pulse of the received train, whether a dot or a no-dot. There is no response to a sync pulse. A pulse train of the same timing as the original clock train of waveform FIG. 3(*a*) but without pulses corresponding to the sync pulses, is thus reconstituted. After being differentiated (to produce a sharp pulse for each cycle of the new clock signal) in a stage 114, these reconstituted clock pulses are applied to synchronise an otherwise free-running multivibrator 115 which accordingly acts as a generator of local clock pulses. These local pulses are applied over a lead 116 to drive a signal distributor in the form of a six-stage binary ring counter 117.

The first five stages CR1 to CR5 of the counter represent the respective rows of the matrix. The output from each stage is applied to one of the two switching inputs of the corresponding one of stylus energising stages DR1 to DR5, which also represent the respective rows. As described below with reference to FIG. 9, each energising stage includes a bistable circuit the output of which is connected to the corresponding stylus so that in one of the stable states of the circuit the stylus is energised but in the other it is not; these states will be referred to as the Set and Reset states respectively.

The output from the sixth stage CR0 of the counter is applied by way of a connection CR0[1] to generator 115 so as to block its output (by retaining it in one of its two unstable conditions) whenever stage CR0 is activated.

The reconstituted clock pulses on lead 113 are also applied to a motor switching stage 122 which rectifies and smoothes the pulses to derive a direct-current signal for initiating the operation of motor 103 after a predetermined number of them have been received, as described below with reference to FIG. 8. Once started in this manner, the motor is maintained in operation by the continued reception at stage 122 of the reconstituted clock pulses, and does not become switched off until their cessation at the end of the message.

Stage 111 also separates from the received signal and applies over a lead 123 the dot or positive pulses of waveform FIG. 3(*f*); the sync and the no-dot pulses do not appear on this lead. Lead 123 is connected as the second switching input to each of the stages DR1 to DR5. The arrangement is such that when each of stages CR1 to CR5 is activated, or holds a pulse, as the counter is stepped through them, the leading edge of the resulting output pulse from the stage resets the bistable circuit in the corresponding stylus energising stage, or maintains it reset if it is already in that state. For the rest of the duration of the output pulse, it holds the DR stage favourably biased so that if a dot pulse should arrive over lead 123 the bistable circuit is switched to its Set state, thereby energising the corresponding stylus. This operation will become clearer from the ensuing description of the operation of the reproducing apparatus as a whole.

The second signal-separating stage 112 derives the sync signals from the input train and applies them over an output lead 124 as a second drive to the counter 117, and by way of a differentiating stage 125 to supply a control to stage CR0.

Connections for purposes to be indicated later are also made from the output of generator 115 to a gating control input of signal-separating stage 111, from the dot pulse output (lead 123) of stage 111 to the motor switching stage 122, and from the output of stage 112 to stage 111.

The operation of the reproducing apparatus is briefly as follows.

In expectation of a message, the apparatus is switched on by connecting the appropriate sources of supply to the various stages that need them. A result is the activation of the local generator 115, which, operating in its free-running condition, begins to deliver pulses over lead 116 to the counter. On being energised by its source of supply, the counter will have activated one of its stages, at random, to its ON state, the others being held OFF in consequence. The first few pulses from the generator step the counter to stage CR0 (assuming that that stage was not the one originally ON), which in response delivers a signal over lead CR0[1] to arrest the generator. The apparatus then remains in this quiescent condition, with stage CR0 ON and generator 115 blocked, with the styli all unenergised and motor 103 inoperative, until the message begins to arrive.

Each message is prefaced by a few blank characters, so that the first part of the received train consists of sync pulses interspersed with groups of five no-dot pulses. Such a train is sufficient to cause the clock pulses to be reconstituted by stage 111. After the predetermined number of these have reached the motor switching stage 122 over lead 113, the stage causes the motor to start up, to begin to feed the tape steadily past the recording head whilst the message is being received.

The first sync pulse to arrive passes over lead 124 to step the counter from stage CR0 to CR1. This frees generator 115, which resumes its supply of local pulses, now synchronised to the received signal by the clock pulses reconstituted by stage 111. The first five of these local pulses step the counter back to stage CR0 and the generator is again blocked. The next sync pulse, however, arrives to step the counter on to stage CR1. Thus whilst the no-character train continues, the counter is smoothly recycled group by group in synchronism with the sync and no-dot pulses. The absence so far of any dot pulses has prevented any switching of the energising stages DR, each of which remains in its reset condition with the associated stylus unenergised.

On the arrival of the message itself, dot pulses begin to appear among the column-representing groups of the received train. Whilst the counter continues to be stepped in synchronism with the received groups as just described, each dot pulse on application to the energising stages over lead 123 arrives there whilst one of the counter stages is activated. Accordingly the dot pulse causes the bistable circuit of the corresponding energising stage to become Set, thereby causing the corresponding stylus to become energised. Though the dot pulse is applied at the same time to the other four energising stages, it is inoperative with them because none of the corresponding counter stages holds a pulse. The bistable circuit remains Set, and the stylus energised, until the counter has been cycled back to the same counter stage, which resets the circuit and de-energises the stylus with the leading edge of its output pulse, unless by then another dot pulse has arrived.

In more detail, and assuming that the first character received is the letter E, to be displayed as shown in FIG. 1, the first group to arrive, representing the column C1, contains a dot pulse in each of the five row positions. The first dot pulse, representing the row R1 position in column C1 and hence the matrix element E1, arrives at the energising stages whilst the counter stage CR1 is activated; thus stylus SR1 becomes energised, to start making a mark in the first element position. By the arrival of the next dot pulse, representing the row R2 position, the counter has been stepped to stage CR2, leaving stylus SR1 energised; consequently it is now stylus SR2 that becomes energised. Thus the first five pulses energise in turn, and leave energised, the five styli, thereby beginning the reproduction of column C1.

After the ensuing sync pulse has initiated a fresh stepping cycle of the counter, the reproduction of column C2 is begun. This differs from column C1 in not requiring marks for the two intermediate elements E7 and E9. As soon as the counter has been stepped to stage CR1, the leading edge of its output pulse resets stage SR1; but this is immediately set again by the first dot pulse, representing element E6, of the new group. Thus stylus SR1 is again energised. The next step of the counter activates stage CR2. This immediately resets stage DR2; but as in this case there is no coincident dot pulse, that stage remains Reset with stylus SR2 now unenergised. Thus a space is left in the position of element E7.

The rest of the reproduction process is on similar lines and need not be described in detail. On its completion, the character is depicted as shown in FIG. 7, where the marks made are indicated by the primed reference numbers of the matrix elements concerned. The slight slope of each column, as reproduced, is due to the steady movement of the tape during the time each group is being received.

On the completion of the character, with the completion of the mark in element E25, the next group of the received train is devoid of dot pulses, and for its duration the tape moves sufficiently without being marked to establish the necessary space between the character already recorded and the one to be recorded next.

The end of a message is signalled by the cessation of a train of signal groups. The resulting absence of any sync pulses to initiate recycling of the counter causes it to be arrested, at stage CR0, by its own arresting of the local pulse generator 115. Similarly the end of the dot and the no-dot pulses terminates the reconstituted clock pulses as supplied over lead 113 to motor control circuit 122; accordingly the motor is switched off.

It will be seen from FIG. 7 that the rate of tape movement together with the rate of cycling the counter (itself determined by the repetition frequency of the input signal pulses) are chosen so that the mark made by each stylus is approximately square. The use of a stylus of the chisel shape described—that is, comparatively narrow in the direction tape movement and comparatively wide normal to it—combined with the practice of maintaining each stylus energised for considerably longer than the duration of the pulse which caused its energisation, results in the metal being burnt off more completely and more evenly, thereby producing a much clearer mark, than in known arrangements in which the styli have square tips of large area and are pulse-energised, and so tend to produce a mark which is a mere ring of vague outline.

The connection from lead 124 by way of differentiating stage 125 to stage CR0 of the counter ensures that the counter is in the correct starting condition at the beginning of each column-representing group of signals. Stage 125 applies the leading edge of each sync pulse to force stage CR0 to its activated state if it is not already in it. In normal fault-free operation the stage is already activated in any case when a sync pulse is due, with the result that the direct application of the pulse edge to the stage has no modifying effect. Should however the counter be out of step either in lag or lead, the ensuing sync pulse would force it to the correct condition.

The correction from the output of generator 115 to the separator stage 111 is to reduce the effect of noise by so gating the stage as to be receptive only when the next pulse of the received train is due. It is also by means of this connection that the required elimination of the sync pulses from the reconditioned train is effected, for the blocking of generator 115 from stage CR0 causes stage 111 to be blocked against each sync pulse of the received signal.

The connection from lead 123 to the motor switching stage 122 is to prevent the motor from being activated by noise or voice signals that may be sharing the same communication channel. A suitable arrangement of stage 122 for this purpose is shown in FIG. 8.

Lead 113 is connected by way of a diode 131, poled to pass the positive pulses of the reconstituted clock train, and a resistor 132 to one electrode of an electrolytic capacitor 133 the other electrode of which is connected to a source of 0 volts. Across the capacitor is connected an NPN transistor 134 by its collector and emitter electrodes; to the base is connected lead 123 by way of a resistor 135. A connection is made from the common point of components 132 and 133 to a power transistor relay stage 136 for energising motor 103, which is of the permanent-magnet type. A connection from the motor armature winding to the base of transistor 134 is made by way of a diode 137 poled to pass negative pulses.

In normal operation, in the absence of voice interference, the initiating groups of the received signal, free from dot pulses, cause the reconstituted clock pulses to build up on capacitor 133 until a potential level is reached sufficient to saturate the transistor of stage 136 and so start the motor. So long as the message continues to be received, the capacitor remains sufficiently charged to keep the motor going. When the pulses cease with the end of the message, the capacitor discharges, stage 136 becomes nonconducting, and the energising circuit of the motor is broken.

A noise or voice signal is characterised by random pulses of both senses. Hence if such a signal arrives at a time when the reproducing apparatus is switched on but is otherwise quiescent, in the absence of a message signal, sufficient spurious clock pulses may be derived by stage 111 and applied to the motor switching stage 122 to cause the motor to be started up, thereby wasting some of the tape. The stage discriminates against such signals in reliance on the presence among them of some positive pulses, which as already explained are absent from the character groups of a message that precede the message itself. Each of these random positive pulses is derived by stage 112 as a spurious dot pulse and, reaching stage 122 over lead 123, renders transistor 134 conductive to act as a short-circuit which effects a complete discharge of capacitor 133. Thus the capacitor is prevented from building up a charge sufficient to switch on the motor.

To prevent capacitor 133 from being discharged by the genuine dot pulses and so stop the motor whilst a message is being received, the voltage developed across the motor is fed back in a negative polarity by way of diode 137 to hold transistor 134 off.

It is partly to avoid misoperation by noise or voice signals that the sync and no-dot pulses of a message train are given the same polarity, different from that of the dot pulses, and so allow the motor to be switched on by a sequence of unidirectional pulses (sync and no-dot) but not by a sequence of pulses of both polarities. This arrangement has a further advantage arising from the fact that when a large pulse (such as a sync pulse) is closely followed by a smaller one of the same polarity, the smaller pulse is liable to be rendered ineffective by the overshoot of the larger on returning to the base line. Where on the other hand the smaller pulse is of the opposite polarity, the overshoot of the larger pulse tends to enhance it. Now the loss of a no-dot pulse can be tolerated, since generator 115 can usually fill the gap and keep the counter in synchronism; but the loss of a dot pulse may be serious, since the character concerned will be distorted to at least some extent by its absence. Hence the no-dot pulses are made the same polarity as the sync pulses and the occasional loss of a no-dot pulse when immediately following a sync pulse is accepted.

Each of the stylus energising stages DR may be as shown in FIG. 9, taking stage DR3 as an example. The stage includes a PNP transistor 141 the emitter of which is connected to lead 123 and the collector to the Set switching input of the bistable circuit 142. The appropriate output point of circuit 142 is connected to the corresponding stylus SR3.

The output from the corresponding counter stage CR3 is connected to the base of the transistor, and to the Reset switching input point of circuit 142 by way of a capacitor 144 and a diode 145 in series, the diode being poled to pass only the leading edges of the output pulses from stage CR3. The common point of components 144 and 145 is connected through a resistor 146 to a source of potential.

In operation, the leading edge of each output pulse from stage CR3 passes through capacitor 144 and diode 145 to reset circuit 142, or confirm it in its Reset condition. Throughout the duration of that pulse, it favourably biases the transistor 141 so that the appearance of a dot pulse in lead 123 renders the transistors conductive, thereby switching circuit 142 to its Set condition and so energising stylus SR3. Circuit 142 remains set after the output pulse from stage CR3 has ceased, until reset by the return of the counter to that stage.

Similar equipment is provided for each of the other DR stages. Although each dot pulse on lead 123 is applied to the emitter of each transistor, none is rendered conductive except the one associated with the one activated counter stage.

Stage 112 receives the signal from detector 106 with the polarities the reverse of those of waveform FIG. 3(*f*), and hence with the sync pulses positive-going. The stage extracts those pulses by means of a transistor amplifier responsive only to positive-going input pulses; in the emitter lead is a resistor-shunted capacitor which at the first sync pulse charges up sufficiently for the amplifier to respond thereafter to pulses only of the sync amplitude; these the stage delivers over lead 124 in the negative sense. Their leading edges, extracted by stage 125, constitute the signals that if necessary force the counter to stage CR0, whereas their trailing edges, extracted by the counter input stage, are those that step it from CR0 to CR1.

A portion of the voltage developed across the shunt resistor is delivered over a lead 147 to apply to stage 111 a bias which sets a threshold level in stage 111 below which incoming signals are rejected.

It is not essential for electrosensitive paper to be used for the recording: photosensitive paper may for instance be used, the recording devices being sources of illumination in strip form aligned across the direction of tape movement. Or xerographic or other form of electrostatic paper may be used, the recording devices being electrodes capable of applying the required electrostatic charge to areas of the paper corresponding to the positions of the styli.

In certain kinds of recording tape, in particular the metallised kind used in the embodiment first described, difficulty may be caused by the accumulation of debris behind each stylus as a message is recorded. This debris tends to lift the stylus off the paper, and moreover, being of a metallic nature, tends to cause current to flow in unwanted areas and even connect one stylus to another.

Various methods of dislodging the debris have been proposed. They include tapping the bank of styli, which is seldom particularly successful, and lifting them off the paper between messages for cleaning by a brush or the like, which is complicated and subjects the styli to unnecessary bending that may eventually cause breakage.

The removal of debris in accordance with the present invention is based on the discovery that if in the absence of a message the slant angle between a stylus and the tape is reduced from an operative value of about 45° to a more acute angle, such as 15°, whilst the contact between stylus and tape is maintained and the tape is kept moving, the backs of the styli are wiped and much of the debris is removed by the moving paper. Suitable mounting arrangements for the styli to allow the debris to be dispersed in this manner are shown in FIG. 10, taking stylus SR5 as an example.

The stylus is mounted on a carriage 151, common to all of them, which is pivoted to the framework 152 of the recording head 102 (FIG. 6) so as to rotate about an axis 153 which is normal to the plane of the paper and coincident with the line of contact between the stylus and the tape 101. Hence a rotational movement of the carriage about axis 153 causes a similar movement of the stylus about its line of contact without significantly changing the pressure between the stylus and the tape.

To control the slant angle $\theta$ between stylus and tape, an arm 154 rigid with the carriage extends in the direction 104 of tape movement. The free end of the arm is urged away from the tape by a tension spring 155, whilst the armature 156 of a solenoid 157 engages an intermediate point on the arm so as to urge it towards the tape when the solenoid is energised.

Whilst a message is being recorded the solenoid is kept energised. This imparts sufficient force to arm 154 to overcome the force of spring 155 and so rotate the carriage and hence the stylus in a counterclockwise direction (as seen in the drawing) sufficiently to maintain the slant angle $\theta$ at the required operative value of approximately 45°, as shown in FIG. 10A.

In between messages the solenoid is de-energised, with the result that spring 155 is now able to rotate the carriage and stylus in the opposite direction to reduce the slant angle to about 15°, as shown in FIG. 10B, thereby causing the debris which has accumulated behind the stylus during the recording process to be dispersed in the manner described.

For this method of removing debris to be effective, it is necessary for motor 103 to remain energised to keep the tape moving for a short time after the solenoid has been de-energised at the end of a message to reduce the slant angle of the styli. On the other hand it is desirable for efficient operation of the recording apparatus that in advance of a message both motor and solenoid should be switched on at the same time as quickly as possible, consistent with the accurate identification of the incoming signal as a message and not as voice or other form of interference. A circuit for satisfying these requirements will now be described with reference to FIG. 11.

For switching on the solenoid 157 in response to a predetermined number of genuine reconstituted clock pulses in the absence of dot pulses, the circuit may be the same as that described with reference to FIG. 8 for switching on the motor 103. The corresponding components of the present circuit are therefore indicated by the same references primed, with the output amplifier 136¹ applied to the solenoid.

For controlling the motor, the output from amplifier 136¹ is also applied to it by way of a resistor 161 and original amplifier 136. The output from amplifier 136 is also applied by way of a large resistor 162 to charge a capacitor 163 of larger value than capacitor 133¹. The high-tension electrode of capacitor 163 is connected to the common point of components 161 and 136 by way of a diode 164 poled to prevent the capacitor from short-circuiting the drive to the motor.

In operation, the motor becomes switched on at the start of a message immediately after the solenoid has become actuated. Thereafter capacitor 163 becomes charged, with resistor 162 large enough to increase the charging time-constant sufficiently to alleviate the additional drain on amplifier 136.

When the actuating signal train on lead 113 ceases at the end of a message, capacitor 133¹ discharges rapidly to switch off amplifier 136¹, thereby de-energising the solenoid and removing the drive from the motor. Capacitor 163, however, by discharging through diode 164, for a while maintains the motor drive, so that the motor keeps on running. As the capacitor discharges through resistors 161 and 162 in parallel at a rate in excess of the charging rate from the motor, amplifier 136 eventually switches off and the motor is stopped. Thus the motor is kept running for a short time after the solenoid has been switched off.

The feedback to prevent the genuine dot pulses from switching off the motor is in this arrangement derived from the output of amplifier 136¹ and applied to the base of transistor 134¹ by way of a resistor 165 and a polarity-reversing transistor 166.

Where a detected signal of the squarewave form shown in FIG. 3(*d*) is found unsuitable because of its direct-current components, an alternating form of modulation may be used instead.

For example, transmitter 32 (FIG. 2) may be modified so that the signals of waveform FIG. 3(*f*) are applied to modulate a carrier in the known phase-shift (sometimes called phase-jump) manner to represent the dot and no-dot signals by in-phase and anti-phase sinewave cycles respectively; the demodulated signal at the reproducer is thus in the form of a single cycle of one or other phase for each.

In this form of modulation, the sync signals can no longer be distinguished from the no-dot signals by a difference of amplitude but only by a difference of position in the signal train. Some modification of the reproducer is therefore necessary, in addition of course to the different form of detector. Suitable changes of the arrangement of FIG. 6 are shown in FIG. 12. The same reference numbers are used again to designate components already described; references 106, 111, and 112, however, are now primed, for though the purpose of each is the same as before, the internal circuitry is different.

Detector stage 106¹ is modified from stage 106 of FIG. 2 on account of the different form of the received signals. The stage derives a single sinewave cycle for each dot signal and, in anti-phase with each such signal, a single cycle for each no-dot and sync signal. The signals so demodulated are applied to separator stages 111¹ and 112¹, which derive over leads 113, 123, and 124, with the aid of the output from pulse generator 115, in a manner to be described, the clock, dot, and sync pulses of the arrangement of FIG. 6.

Generator 115 is again a free-running multivibrator controlled by the reconstituted clock pulses from lead 113 by way of differentiator stage 114 and a two-entry Or gate 171. The output from the generator is applied to stage CR1 of the counter 117 as before, as well as to stages 111¹ and 112¹.

The output from stage CR0 of the counter is applied to the other input of gate 171 by way of an Inhibit gate 172 the control of which is exercised by any one of three sources, combined by an Or gate 173. Two of these sources are the output from the generator, applied over a lead 174, and the sync pulses on lead 124. The third is supplied from the clock pulses on lead 113 after integration by a stage 175 the time constant of which will be indicated later.

A control connection is also made from stage CR0 to stages 111¹ and 112¹ by way of a lead 176.

The rest of the reproducer, including the styli and their energising stages together with the motor and its control system, may be as already described.

In operation, in the standby condition of the reproducer, stage CR0 is ON. As none of the three inputs to gate 173 is as yet energised, gate 172 is open. Accordingly stage CR0 is clamping generator 115 in one of its two conditions which for convenience will be referred to as state A, the other being state B. Acting over lead 176, stage CR0 is also holding separator 111¹ blocked, but separator 112¹ is unblocked. In its state A, the generator, acting over lead 116, is applying unblocking signals to both separators, but is overridden as regards separator 111¹ by the blocking signal imposed by stage CR0.

The first signal of an incoming message will be a sync signal; the pulse derived from it by the unblocked separator 112¹ is applied by way of lead 124 and gate 173 to close gate 172 and so free the generator. In response, the generator switches over to its state B. This has two effects. First, the state B form of output from the generator, acting over lead 116, causes both stages 111¹ and 112¹ to be blocked against the first half-cycle of the next signal; second, the counter is stepped from stage CR0 to stage CR1. With stage CR0 now switched off, its output condition as applied over lead 176 unblocks stage 111[1] and blocks stage 112[1].

After an interval determined by the time constant of its interstage coupling, generator 115 reverts to state A, in time to allow stage 111[1] to respond to the second half-cycle of the next signal. As the sense of that half-cycle will indicate whether it represents a dot or a no-dot, stage 111[1] is able to distinguish between those two signals and so derive a dot or a no-dot pulse, as the case may be. The dot pulses are delivered over lead 123 and the dot plus the no-dot—in other words, the reconstituted clock train—over lead 113 as before.

The free-running frequency of generator 115 is slightly faster than the repetition frequency of the reconstituted pulse train; the effect of each pulse of which is accordingly to hold the generator in state A until the desired cyclic period is made up. At the end of each pulse, the generator at once switches over to state B, reverting to state A in dependence on its own time constant. In this way the generator is synchronised to the received train.

The ensuing generator pulses step the counter much as before.

The reversion of the counter to state A allows stage 112[1] to pass the appropriate half-cycle of the sync signal if that signal is present and the stage is not blocked by stage CR0.

In addition to assisting stages 111[1] and 112[1] to separate the signals as described, the signal applied to them over lead 116 has the gating effect which reduces noise as in the previous arrangement.

Before the counter has been stepped back to stage CR0 at the end of the first group, the capacitor in the time-constant network of integrator 175 has developed a potential sufficient to hold gate 172 closed and so prevent stage CR0 from blocking the generator at the end of the group. When the end of the character is reached at the end of the fifth group, the ensuing interval (as determined by the received signal) before the start of the next character is long enough to allow the capacitor to discharge sufficiently to open gate 172, so that when stage CR0 is next ON, the generator becomes blocked. The time constant of stage 175 is nevertheless made long enough to maintain the generator in operation for another scan of the counter, thereby allowing the no-dot signals which constitute the whole of that further group to reset all the DR driving stages that were set during the last group of the character; otherwise the corresponding styli would remain energised and so produce a smear.

The generator remains blocked until the arrival of the sync signal at the start of the next character. The sync pulse derived from it by stage 112[1] closes gate 172 and so frees the generator.

The sync signals that arrive at the start of each of the second to fourth groups of a character reach gate 172 only to find it already closed by the integrated clock signal from stage 175.

Whereas in the arrangement of FIG. 6, the reproducer is synchronised by the sync signal at the end of each group, in the present arrangement the reproduction is synchronised only at the end of each character. This less frequent synchronisation, however, is not usually found disadvantageous, for if in the arrangement of FIG. 6 a group is defective through asynchronism, the correction of the remaining groups will still leave the character to some extent distorted, and perhaps unreadable.

The control of gate 172 exercised from the generator over lead 174, which ensures that the gate is closed whilst the generator is in its B state, is provided for the following reason. As already explained, stepping of the counter is effected by the switching of the generator to state B. It will therefore be in that state at the start of each period of the ON condition of stage CR0. If gate 172 were open at that time, stage CR0 would clamp the generator in its state B rather than in the state A which is necessary for the correct functioning of the apparatus. The control connection from the generator to gate 172 ensures that the gate remains closed until the generator has reverted to state A. It will be appreciated from the above description that the sync signal cannot ensure this, for that signal is not developed by stage 112[1] until the generator has reverted to its A state. Normally the integrated clock signal from stage 175 will be holding gate 172 closed by the time stage CR0 is ON, but under certain conditions stage 175 may not have built up a sufficient potential by the end of the first group of a character.

In addition to the advantages of (a) forming marks of especial clarity, (b) arranging for the motor to be switched on only when a message is beginning to arrive, (c) preventing misoperation by voice transmissions, and (d) ensuring correct synchronisation, the reproducing apparatus in accordance with the invention has the merit of requiring only a few stages of no great complexity and hence of being inexpensive in construction and easily portable.

What we claim is:

1. A character transmission and reproduction system comprising transmitting apparatus which includes signal-encoding stages for automatically encoding each character into the appropriate elements of a matrix of $N_E$ elements arranged in $N_C$ columns and $N_R$ rows, signal-deriving means for deriving from each character so encoded, a train of $N_C$ groups each of $N_R$ mark/space electrical signals in series, the groups representing the columns of the matrix in turn and the signals in each group representing the required mark or space condition of the respective elements of the column concerned, and means for transmitting each such train of signals, and reproducing apparatus which includes a drive for feeding responsive material in tape or sheet form steadily past a recording head, an assembly of $N_R$ recording devices disposed in a row at the recording head across the direction of feed of said material, the material being such that a device when electrically energised causes a visible mark to be recorded on the material as an element of said matrix, signal-separator means for separating the mark signals from the groups of a received train, a signal distributor operative as the responsive material is fed past the recording head for causing each separated mark signal of a group to be applied to energise the recording device which represents the row position of the element represented by that mark signal, said signal distributor including a counter having $N_R$ digit stages and a further digit stage, $N_R$ energising stages for energising the respective recording devices under the control of said $N_R$ digit stages, a generator of local pulses, means connecting said generator to said further digit stage for blocking and unblocking said generator under the control of said further digit stage and means for synchronising the generator to the mark/space signals of each group.

2. A system as claimed in claim 1 wherein the signal-encoding stages include a stage having $N_E$ element-representing output conductors arranged to represent the character, as encoded, by the distinctive state of energisation of each output conductor which represents an element to be marked.

3. A system as claimed in claim 2 wherein the signal-deriving means includes arrangements for scanning said output conductors so as to sense the state of each in turn, thereby deriving said train of signals.

4. A system as claimed in claim 3 wherein each of said output conductors is associated with a two-state device the state of which is determined by the distinctive state of energisation of the conductor, said scanning arrangements being such as to sense the states of the two-state devices.

5. A system as claimed in claim 3 wherein the scanning arrangements include at least one multi-stage counter.

6. A character transmission and reproduction system comprising transmitting apparatus which includes signal-encoding stages for automatically encoding each character into the appropriate elements of a matrix of $N_E$ elements arranged in $N_C$ columns and $N_R$ rows, signal-deriving means for deriving from each character so encoded a train of $N_C$ groups each of $N_R$ mark/space electrical signals in series, the groups representing the columns of the matrix in turn and the signals in each group representing the required mark or space condition of the respective elements of the column concerned, and means for transmitting each such train of signals, and reproducing apparatus which includes a drive for feeding responsive material in tape or sheet form steadily past a recording head, an assembly of $N_R$ recording devices disposed in a row at the recording head across the direction of feed of said material, the material being such that a device when electrically energised causes a visible mark to be recorded on the material as an element of said matrix, signal-separator means for separating the mark signals from the groups of a received train, a signal distributor operative as the material is fed past the recording head for causing each separated mark signal of a group to be applied to energise the recording device which represents the row position of the element represented by that mark signal, said signal distributor comprising a binary ring counter of at least $N_R$ digit stages, $N_R$ bistable stages for energising the respective recording devices under the control of said digit stages, a generator of local pulses for stepping the counter, each of the energising stages having Set and Reset stable states in which the associated recording device is and is not energised, respectively, means for stepping the counter stage by stage through each group of a received train, means for applying each mark signal to all the said energising stages, and means for controlling each energising stage from the associated digit stage so that the digit stage when activated resets the energising stage if not already in its Reset state and then allows it to be switched to its Set state by a mark signal if present, the energising stage when switched as aforesaid remaining in its Set state until switched to its Reset state by that digit stage when actuated in response to the next group of the received signal and means for synchronising the generator to the mark/space signals for each group.

7. A system as claimed in claim 6 wherein the means for stepping the counter includes a generator of local pulses and means for applying said pulses to step the counter.

8. A system as claimed in claim 7 wherein the transmitting apparatus includes means for adding to each of said groups of transmitted signals a synchronising signal distinguished from both the mark and the space signals.

9. A system as claimed in claim 8 wherein the counter includes in addition to the $N_R$ digit stages a further digit stage, connections from that further stage to said generator to block the generator when that stage is activated, and means for activating that stage at the end of each group, the synchronising arrangements further including arrangements for applying each synchronising signal to unblock the generator in advance of each group.

10. A system as claimed in claim 7 wherein the transmitting apparatus includes means for adding to each of said groups of transmitted signals a synchronising signal distinguished from one of the mark or space signals only by the location of the synchronising signal in the train of signals.

11. A system as claimed in claim 10 wherein the transmitting apparatus is such that the signals are transmitted in the form of a phase-shift modulation of a carrier signal.

12. A system as claimed in claim 10 wherein the reproducing apparatus includes means for extracting the synchronising signals under the control of said generator and applying each of those signals to synchronise the received signals only at the start of each character.

13. A system as claimed in claim 6 wherein said drive includes a motor, means for starting the motor in advance of a train of message signals, said means comprising a drive switching stage including a capacitor, means for applying the space signals to charge the capacitor, and a relay in the motor energising circuit, and means for connecting the capacitor to the relay, the capacitance of the capacitor being such that the relay is operated to initiate the drive when the charge in the capacitor has been built up to a predetermined potential level.

14. A system as claimed in claim 13 wherein said drive switching stage includes means for applying any noise signals resembling the mark signals to reduce the charge held by the capacitor and a feedback connection from the motor to insure that the genuine mark signals are not so applied once the drive has begun.

15. A system as claimed in claim 6 wherein each recording device is in the form of a stylus in engagement with a surface of the responsive material, the stylus being shaped to provide a substantially straight line-contact with the material in a direction normal to that of the feed and the body of the stylus being slanted away from that direction to avoid risk of cutting the material.

16. A system as claimed in claim 15 further including slant-angle control means for automatically reducing the slant angle of each stylus from the operative value of that angle at predetermined intervals between said groups, the material being maintained in motion with each stylus in contact with it at that reduced slant angle, and for automatically restoring the slant angle to the operative value prior to the next group.

17. A system as set forth in claim 6 wherein each recording device is in the form of a stylus in engagement with a surface of the responsive material, the stylus being shaped to provide a substantially straight line-contact with the material in a direction normal to that of the feed, the body of the stylus being slanted away from that direction, slant-angle control means for automatically reducing the slant angle for each slant angle of each stylus from the operative value of that angle at predetermined intervals between said groups, the responsive material being maintained in motion with each stylus in contact with it at that reduced slant angle, and for automatically restoring the slant angle to the operative value prior to the next group, and wherein said drive includes a motor, means for starting the motor in advance of a train of message signals, said means comprising a drive switching stage including a capacitor, connections for applying the space signals to charge the capacitor, a motor energising circuit including a relay, means for connecting the capacitor to the relay, the capacitance of the capacitor being such that the relay is operated to initiate the drive when the charge in the capacitor has been built up to a predetermined potential level.

18. A system as set forth in claim 17 wherein said drive switching stage includes means for applying any noise signals resembling the mark signals to reduce the charge held by the capacitor and a feedback connection means from the motor for insuring that the genuine mark signals are not so applied once the drive has begun.

19. A reproduction system for reproducing characters encoded into elements of a matrix and represented by a train of $N_C$ groups, each of $N_R$ mark/space electrical signals in series comprising a drive for feeding electroresponsive material in tape or sheet form steadily past a recording head, an assembly of recording devices disposed in a row at a recording head across the direction of feed of said material, means for electrically energising the recording device so as to cause a visible mark to be recorded on the material, signal-separator means for separating mark signals from an encoded train of groups, a signal distibutor operative as the material is fed past a recording head for causing each separated mark signal of a group to be applied to energise the recording device which represents the position of the element of the matrix represented by that mark signal, said signal distributor comprising a binary ring counter comprising a digit stage for each recording device, a further digit stage, a bistable stage for each recording device for energising the respective recording devices under the control of a corresponding digit stage, each of the energising stages having Set and Reset stable states in which the associated recording device is and is not energised, respectively, means for stepping the counter stage by stage through each group of a received train, means for applying each mark signal to all the energising stages and means for controlling each energising stage from the associated digit stage so that the digit stage which activated resets the energising stage if not already in its reset state and then allows it to be switched to its Set state by a mark signal if present, the energising stage when switched as aforesaid remaining in a Set state until switched to its Reset state by that digit stage when actuated in response to the next group of the signal, a generator of local pulses, means connecting said generator to said further digit stage for blocking and unblocking said generator under the control of said further digit stage and means for synchronising the generator to the mark/space signals of each group.

20. Reproduction as set forth in claim 19 wherein each recording device is in the form of a stylus in engagement with a surface of the responsive material, the stylus being shaped to provide a substantially straight-line contact with the material in a direction normal to that of the feed and the body of the stylus being slanted away from that direction.

21. A system as set forth in claim 20 further including slant/angle control means for automatically reducing the slant angle of each stylus from the operative value of that angle at predetermined intervals between said groups while the material is maintained in motion with each stylus in contact with it at that reduced slant angle and for automatically restoring the slant angle to the operative value prior to the next group.

References Cited

UNITED STATES PATENTS

| | | | |
|---|---|---|---|
| Re. 23,713 | 9/1953 | Hunt | 178—30 |
| 2,375,820 | 5/1945 | Ridings | 346—139 |
| 2,969,730 | 1/1961 | Brehm | 178—30 |
| 3,286,029 | 11/1966 | Simshauser | 178—30 |

THOMAS A. ROBINSON, Primary Examiner

MARSHALL M. CURTIS, Assistant Examiner

U.S. Cl. X.R.

178—23, 26

PO-1050
(5/69)

UNITED STATES PATENT OFFICE
CERTIFICATE OF CORRECTION

Patent No. 3,484,550 Dated December 16, 1969

Inventor(s) Albert George Coulter et al.

It is certified that error appears in the above-identified patent and that said Letters Patent are hereby corrected as shown below:

Column 6, line 17, "and" should read --to--. Column 7, line 6, after "transistor" insert --61--; line 13, cancel "source", second occurrence. Column 10, line 30, after "move" insert a hyphen. Column 18, line 34, cancel "for each slant angle". Column 19, line 8, "which" should read --when--.

SIGNED AND SEALED
JUN 23 1970

(SEAL)
Attest:

Edward M. Fletcher, Jr.
Attesting Officer

WILLIAM E. SCHUYLER, JR.
Commissioner of Patents